Nov. 11, 1947.　　　L. V. COLWELL　　　2,430,844
ROTARY CUTTING TOOL
Filed June 12, 1944　　　2 Sheets-Sheet 1
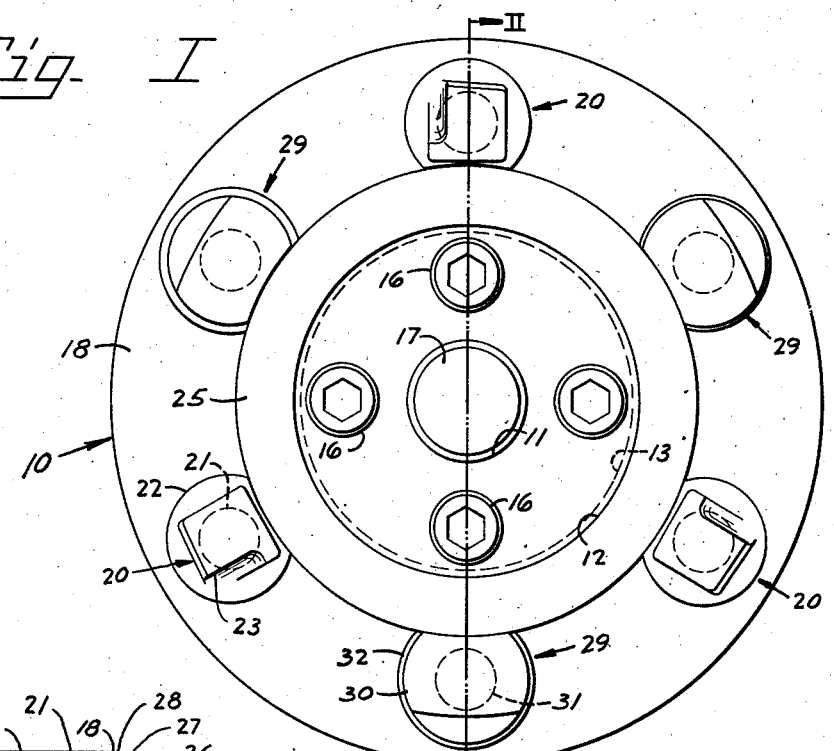
Fig. I
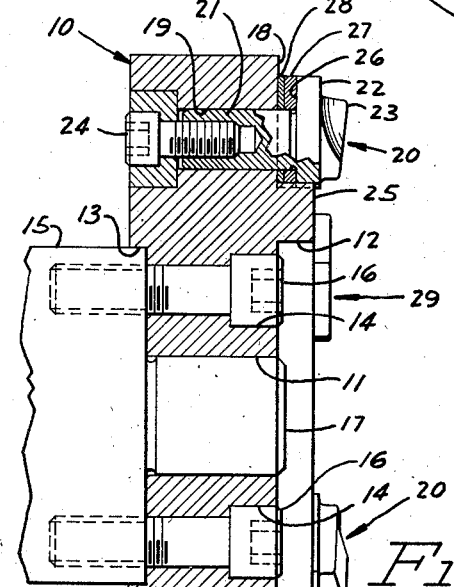
Fig. II
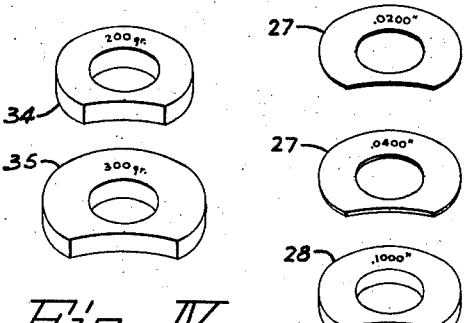
Fig. IV
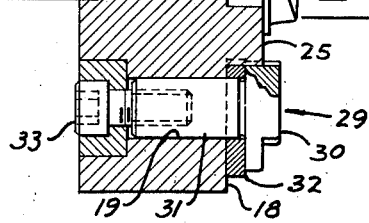
Fig. III
INVENTOR.
Lester V. Colwell
BY
Marshall & Marshall
ATTORNEYS

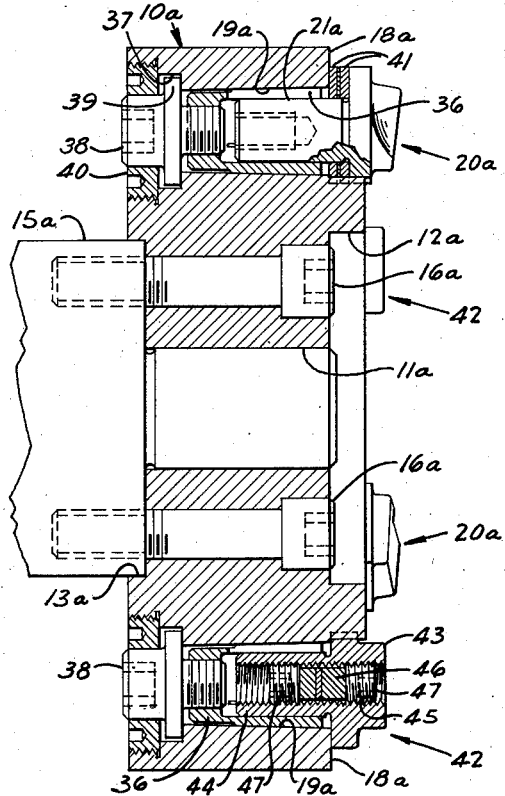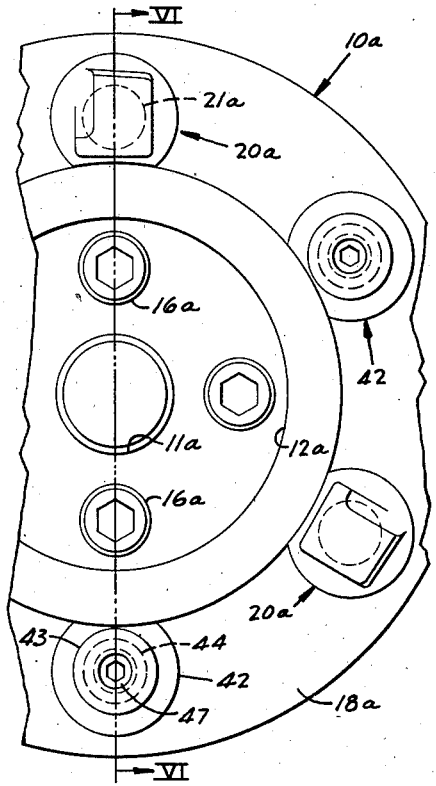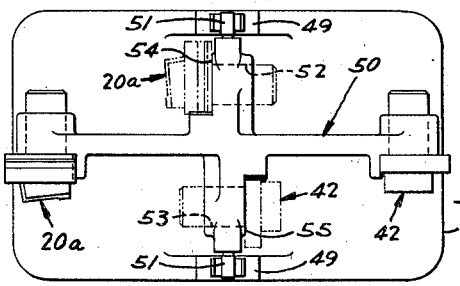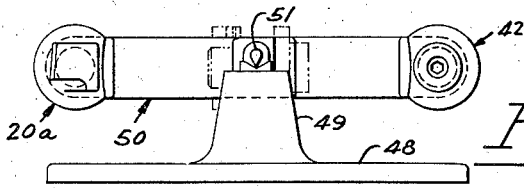

Patented Nov. 11, 1947

2,430,844

UNITED STATES PATENT OFFICE 2,430,844

ROTARY CUTTING TOOL

Lester V. Colwell, Ann Arbor, Mich., assignor to Defiance Machine Works, Inc., Defiance, Ohio, a corporation of Ohio Application June 12, 1944, Serial No. 539,873

13 Claims. (Cl. 29—105)

This invention relates to rotary cutting tools of the type used in milling machines, boring mills, and similar machine tools and more particularly to rotary cutting tools adapted to generate generally flat surfaces.

The rotary cutting tools now commonly used in milling machines, boring mills and similar machines comprise a cutter body adapted to be mounted on a rotating spindle or arbor and a series of cutting teeth either formed integrally with the body, welded to it, or clamped in recesses in the body.

The cutting teeth of these tools are sharpened by grinding in a tool grinder after they are assembled in the cutter body. While such a grinder will sharpen the teeth symmetrically with respect to the axis in the grinder about which the tool rotates during sharpening there is no assurance that that axis coincides precisely with the axis of the tool. Likewise, there is no assurance that when the tool is mounted in the milling or boring machine the axis of the tool is precisely coincident with the axis of the spindle or arbor. It is, therefore, quite probable that after a tool has been sharpened and returned to its place in a machine the cutting edges of all the teeth will not lie in the same surface of revolution and one or more of the teeth will cut deeper and thus leave objectionable tool marks. This is an undesirable condition and contributes materially to the roughness of the finished surface.

The object of this invention is to provide a rotary cutting tool whose teeth are removable for sharpening without disturbing the precision mounting of the tool on the machine spindle.

Another object is to provide a removable tooth rotary cutting tool whose teeth may be positively and precisely located with respect to the intended cutting plane.

Another object is to provide a removable tooth rotary cutting tool in which some of the teeth may be positioned to take heavy roughing cuts while others are ground and adjusted to take light finishing cuts.

Another object is to provide means for accurately balancing and maintaining the balance of a rotary cutting tool so that it may be satisfactorily operated at high speed.

These and more specific objects and advantages are apparent from the following description in which reference is made to the accompanying drawings.

In the drawings:

Figure I is a front elevation of a rotary cutting tool incorporating certain features of the invention.

Figure II is a vertical section of the rotary cutting tool taken substantially along the line II—II of Figure I.

Figure III is a perspective view of representative samples of spacers to be used to position the cutting teeth with respect to the cutter body.

Figure IV is a perspective view of representative samples of balancing weights to be used to balance the variation in mass of cutting teeth of the cutting tool.

Figure V is a fragmentary front elevation of a modified form of rotary cutting tool.

Figure VI is a vertical section of the modified form of cutting tool taken along the line VI—VI of Figure V.

Figure VII is a plan of a weighing balance which may be used to check the balance between the tooth and its corresponding balancing means.

Figure VIII is an elevation of the weighing balance shown in Figure VII.

The specific examples shown in the drawings illustrate a structure in which the advantages of the invention may be obtained. Fundamentally, the invention consists in providing a rotary cutting tool, having a body portion adapted to be precisely mounted on a rotating spindle or arbor, with removable cutting teeth which may be precisely mounted with respect to the body portion and removable balancing weights which maintain the cutting tool in precise running balance.

According to the invention, the cutter body is provided with a reference plane or surface, symmetrical with respect to the axis of rotation, and means, such as spacers of predetermined thickness, for spacing the individual cutting teeth from the reference surface. In the improved structure the teeth are removed for sharpening. After sharpening they are gaged individually and are reassembled into the cutter body with spacers selected according to the sharpened tooth dimensions. This procedure ensures that the cutting edges will be precisely located with respect to each other and to the reference plane. It should be noted that some of the teeth may be intentionally set to take heavier or lighter cuts and thus allow both roughing and finishing cuts to be made simultaneously.

The invention further contemplates the provision of removable balancing means, of a shape generally similar to that of the cutting teeth, to be inserted into the cutter body in lieu of cutting teeth when it is desired to operate the cutter with less than its full complement of teeth. These balancing means are made capable of adjustment to accommodate any change in weight which may result from sharpening of the teeth. Thus this improved structure provides adjustments to minimize all the inaccuracies of positioning and balancing resulting from sharpening an integral tooth rotary cutter on one spindle or arbor and then remounting it on another spindle or arbor for use.

In the specific examples shown in the drawings the rotary cutting tool consists of a generally disk shaped cutter body 10 provided with an axial bored hole 11, shallow counterbores 12 and 13 in its front and rear surfaces concentric with the hole 11 and four symmetrically spaced holes 14 extending from the bottom of one counterbore to the other. The cutter body 10 is mounted on a spindle 15 and is secured thereto by four socket head bolts 16 passed through the holes 14 and threaded into the end of the spindle 15. The cutter body 10 is positively positioned by a centering plug 17 extending from the end of the spindle 15 and by the engagement of the end of the spindle 15 in the counterbore 13 in the rear face of the cutter body 10.

The cutter body 10 is further provided with an annular reference surface 18 on its front face near its periphery and a plurality of holes 19 extending axially through the cutter body from the reference surface 18.

A series of cutting teeth 20 each of which comprises a cylindrical shank 21, a cylindrical head 22 and a cutting tip 23 are mounted in the cutter body 10 with the shanks extending into but not through the holes 19. The teeth are held in place by socket head screws 24 which are threaded into the shanks 21 from the rear face of the cutter body 10. The cutting teeth 20 are prevented from rotating by an arcuate notch cut in the periphery of the head 22 which engages the outside cylindrical surface of a rectangular cross section bead 25 left on the front face of the cutter body 10 between the reference surface 18 and the counterbore 12. The head portions 22 of the cutting teeth 20 are also provided with surfaces 26 which when the teeth are mounted in the cutter body lie parallel to the reference surface 18. Washers 27 and 28, selected from a series of washers of graduated thickness, are interposed between the surface 26 and reference surface 18 to locate the cutting teeth 20 with respect to the cutter body 10. Figure III shows three representative samples of the series of washers.

The cutter body 10 is statically and dynamically balanced before any of the teeth are installed. Therefore it is necessary when some of the teeth are intentionally omitted to replace them with balancing weights 29. Each of the balancing weights 29 comprises a head portion 30 of substantially similar shape to the cutting tooth head 22 and a shank portion 31 similar to the tooth shank 21 and a washer 32. While this is shown as a single washer, in practice several washers may be used simultaneously. This assembly is held in place by a socket head screw 33 threaded into the shank portion 31 in the same manner that the cutting tooth 20 is held. Because the weight of the cutting teeth will vary slightly from tooth to tooth and is materially changed by sharpening, a series of washers of graduated weight are provided from which the washer 32 may be selected. Representative samples 34 and 35, as shown in Figure IV, are of a shape generally similar to that of the spacing washers used under the cutting teeth. The graduations in mass are obtained by varying the thickness, the outside diameter, or the density either singly or in combination. It is thus possible, by selecting washers of suitable thickness and suitable density, not only to statically balance the weight of the cutter but to so locate the center of mass of the balancing weight as to secure dynamic balance as well.

A similar cutter body 10a is shown in Figure V. In this modification the cutter body 10a is provided with an axial pilot hole 11a, counterbores 12a and 13a and bolts 16a by which it is secured to the end of a spindle 15a. This cutter body 10a is also provided with a reference surface 18a and a series of holes 19a extending through the cutter body from the reference surface 18a. However, the holes 19a are tapered while the corresponding holes in the previously described cutter body are cylindrical. Each of the holes 19a is provided with a collet 36 adapted to grip the shank 21a of a cutting tooth 20a. The rear surface of the cutter body 10a around each of the holes 19a is provided with a stepped counterbore 37 in which is located a collet closing screw 38 having a socket head and a flanged portion 39 adapted to engage the bottom of the counterbore 37. The collet closing screw 38 is held in place in the counterbore 37 by an annular nut 40 surrounding the cylindrical outer end of the collet closing screw 38 and screwed into the counterbore 37. While the annular nut 40 does not clamp the collet closing screw 38, it provides a surface against which the flanged portion 39 of the collet screw 38 may act when disengaging the collet. A series of washers 41 similar to the washers 27 and 28 are used to space the cutting teeth 20a from the reference surface 18a.

Adjustable balancing means are also provided to balance the cutting teeth. In this modification the balancing means comprises a body 42 having a head 43 and a shank 44. The shank 44 is adapted to be held by the collets 36. An axial threaded hole 45 extending through the head 43 and the shank 44 contains a series of wafers 46 which are held in place by threaded disks 47. The wafers 46 are selected from a series of wafers of graduated weight and serve the same function as the washers 34 and 35.

The cutting teeth and the balancing means may be released for removal from the cutter body 10a by a turn or two of the collet closing screws 38 whereas in the structure first described the clamping screws 24 and 33 had to be completely unscrewed. Thus this arrangement requires considerably less time in the removal and replacing of the cutting teeth.

It is a comparatively simple matter to design a fixture to hold the removable cutting teeth for sharpening. Such a fixture may be adapted to be used in an ordinary surface grinder or similar tool. The jig may have provisions for holding several of the teeth so that they may be sharpened simultaneously. After the teeth have been sharpened to the desired shape the distance from the tip of the tooth (the portion which is adjacent the finished surface during cutting) to the back surface of the head portion 22 is carefully measured. If it is found that a difference in this dimension exists between the several teeth, washers of suitable thickness are selected from the graduated series and inserted between the rear surfaces 26 of the head portions 22 of the cutting teeth and the reference surface 18 to bring the tips of the cutting teeth into a common cutting plane.

To get the required precision of adjustment and still not require an exorbitant number of washers it is advisable to use at least three washers under each tooth at all times. Each of the series of washers from which such three washers are selected may be made up of three groups, the first group having a gradient, i. e., a difference in thickness, between washers equal to the allowable tolerance in tooth position, the second group having a gradient between washers equal to the range covered by the first group, and the third group having a gradient equal to the range of the second group. For example, if it is desired to position the cutting edges to an accuracy of .00025 of an inch, and the expected difference in height between the respective cutting teeth after sharpening does not exceed .025 of an inch, a series of washers having the following dimensions is sufficient:

| Group I | Group II | Group III |
|---------|----------|-----------|
| .02000 | .04000 | .10000 |
| .02025 | .04100 | .10500 |
| .02050 | .04200 | .11000 |
| .02075 | .04300 | .11500 |
| ------ | .04400 | .12000 |

Thus by selecting and using three washers at a time from this series of 14 washers it is possible to get a range of adjustment of approximately .025 of an inch in steps of .00025 of an inch, i. e., 100 steps. It should be understood that the basic dimension of each group of the series may be made any convenient value and is not necessarily limited to the specific dimension mentioned. Thus it may be desirable to make the basic dimension of each of the groups of the series the same and equal to one third of the minimum distance that will be required between the rear surface of the tooth head 22 and the reference surface 18. As was previously mentioned, a cutter constructed according to the invention offers the additional advantage that in face milling both roughing and finishing cuts may be taken with one pass of the cutter across the work. This is done by grinding one or more of the cutting teeth to take a shaving cut, i. e., to cut a thin wide chip, and, by proper selection of washers, setting that tooth or teeth out one or two thousandths of an inch from the plane of the remaining teeth. It is, of course, necessary that the tips of the roughing teeth extend radially outward beyond the tip of the finishing tooth, in order to rough machine the surface ahead of the finishing tooth. With this tooth setting the radially outermost tips of the roughing teeth first engage the work as it is traversed past the end of the spindle, and then the finishing teeth, set at a smaller radius, take their cut from the rough machined surface.

The balancing washers which are used under the balancing member 29, or the wafers 46 which are used in the modified form of balancing member 42 are also arranged in incremental series similar to the spacing washers.

Whether the balance weight retainer 29, illustrated in Figure II, or the retainer 42, illustrated in Figure VI, is employed, the outermost surface of the head of the retainer and of the weights retained thereby lies back of the cutting surfaces of cutters 20. This construction prevents any engagement between the balance weight retainers and the surface of the workpiece.

Because the cutter body without the teeth is dynamically and statically balanced it is only necessary to be sure that the individual teeth and their cooperating balancing members are in balance between themselves. To determine this condition of balance a simple weighing balance is provided in which a tooth with its washers and the associated balancing member are positioned relative to each other similarly to their positions in the cutter body. A suitable balance, as shown in Figures VII and VIII, comprises a base 48, fulcrum stands 49 erected on the base 48, and a lever 50 whose extremities are machined to simulate the tooth receiving portions of the cutter body. The lever 50 is provided with knife edge pivots 51 which correspond, in relative position, to the axis of rotation of the cutter body. After the sharpened tooth has been measured and the appropriate washers selected, it with the selected washers is placed in position in one end of the lever 50. The corresponding balancing member 42 or 29, depending upon which type is being used, is placed in position in the other end of the lever 50. Wafers or washers selected from the graduated weight series are then added until the selected wafers or washers when combined with the balancing member 42 or 29 bring the lever 50 into equilibrium. When a balance has been obtained the parts may be transferred from the lever 50 to the cutter body 19 with assurance that the complete cutter will be in substantially perfect static balance.

It is also desirable that the teeth and associated balancing members be in running balance. They will be in running balance if their masses are equal and their centers of gravity are on a line perpendicular to the axis of rotation and equally distant therefrom. Because balancing on the lever 50 does not ensure that the centers of gravity of the tooth and the associated balancing member will be on a line perpendicular to the axis of rotation it does not ensure running balance. Such running balance can be attained if the centers of gravity are on the same side and equally distant from the reference surface 18 or 18a since this surface is perpendicular to the axis of rotation. Therefore, the lever 50 is provided with bores 52 and 53 parallel to its length and intersecting reference surfaces 54 and 55. The reference surfaces 54 and 55 are on opposite sides of and equidistant from the pivot axis. The statically balanced tooth and balancing member are placed in the bores 52 and 53 and in contact with the reference surfaces 54 and 55. If the lever then balances the respective centers of gravity are on opposite sides and equidistant from the pivot axis and, therefore, will be on the same side of and equidistant from the reference surface 18 or 18a when the tooth and balancing member are mounted in the cutter body. The threaded bore in the balancing member 42 permits the selected wafers to be adjusted axially to achieve the second balance. Thus provision is made for individually sharpening the teeth, adjusting them precisely to the desired relation with each other and maintaining that nicety of running balance required for high speed operation.

These specific examples thus illustrate a structure adapted for very precise face milling operations. The cutter body may be first installed on the spindle and lined up as accurately as possible and the reference surface accurately indicated as the spindle is rotated. If a small "run out" or wobble is observed and a small running unbalance may be tolerated, a light cut may be taken from the reference surface to true it or the amount of the wobble may be measured and taken into account when the spacing washers are selected. For example, if it is found that the cutter body 10 has a wobble amounting to .002 of an inch it is a comparatively simple matter to algebraically add to the required washer thickness the departure of that portion of the reference surface from its true position. Therefore, when the teeth are assembled in the cutter body they will follow a path true with respect to each other and the work even though the cutter body itself is not precisely mounted. Such a result is impossible to obtain in the conventional type of structure because no such adjustments are available.

Having described my invention, I claim:

1. A rotary cutter for generating a flat surface, comprising a cutter body having a reference surface symmetrical about the axis of rotation of the cutter and generally perpendicular thereto, a plurality of cutting teeth, each having a surface parallel to said reference surface, a plurality of spacers, each of which has two parallel sides and is of a predetermined thickness, for spacing said reference surface from the parallel surfaces of the cutting teeth so as to bring the axially outermost point of each cutting tooth into a given plane of rotation, and means for holding the cutting teeth in a fixed position relative to the cutter body.

2. A rotary cutter for generating a flat surface, comprising a cutter body having a reference surface symmetrical about the axis of rotation of the cutter and generally parallel to the generated flat surface, a plurality of cutting teeth each having a surface parallel to said reference surface when mounted on said cutter body, and a plurality of spacers selected from a graduated series for spacing said cutting teeth from said reference surface to adjust the relative engagement of said teeth with the generated surface.

3. A rotary cutter for generating a flat surface, comprising a cutter body having a reference surface symmetrical about the axis of rotation of the cutter and generally parallel to the generated flat surface, a plurality of cutting teeth each having a surface parallel to said reference surface when mounted on said cutter body, and spacers selected from series of spacers of graduated thickness for individually spacing said teeth with respect to said reference surface.

4. A rotary cutter for generating a flat surface, comprising a balanced cutter body having a reference surface generally parallel to the surface to be generated and a series of symmetrically spaced bores through said reference surface, a plurality of teeth mountable in some of said bores, each having a flat surface juxtaposed to said reference surface, spacers for individually spacing said teeth from said reference surface, and a series of balancing members mountable in those of said bores diametrically opposite cutting teeth, said balancing members being of such mass as to balance the cutting tooth mounted diametrically opposite thereto.

5. A rotary cutter for generating a flat surface, comprising a balanced cutter body having a reference surface symmetrical with respect to the axis of rotation, a series of cutting teeth, each having a surface parallel to said reference surface, interchangeable spacers of predetermined thickness for individualy setting each tooth with respect to said reference surface, balancing members of adjustable mass for balancing each of said teeth, said teeth and said balancing members being mounted in diametrically opposed pairs to maintain said cutter body in balance and means for holding said teeth and said members in fixed relation to said cutter body.

6. A rotary cutter comprising a balanced cutter body having a reference surface symmetrical with respect to the axis of rotation, a plurality of cutting teeth each having a surface parallel to said reference surface when mounted on said body, interchangeable spacers of graduated thickness for spacing said teeth from said surface and means for holding said teeth to said body.

7. An apparatus according to claim 6 in which the cutting teeth are held in collets mounted in the cutter body.

8. In a rotary cutting tool adapted to generate a flat surface, in combination, a cutter carrying body mounted for rotation on an axis perpendicular to the surface to be generated, said body being balanced both statically and dynamically, a plurality of pairs of diametrically opposed axially extending bores in said body, removable cutters mounted in one of each pair of bores, a weight retainer mounted in the other of each pair of bores and variable balance weights removably retained by said weight retainers, said weight retainers and the weights retained thereby lying back of the cutting surfaces of said cutters, said balance weights being variable both as to total weight for varying their moments about said axis and as to location of weight on a line parallel to said axis.

9. In a rotary cutting tool adapted to generate a flat surface, in combination, a cutter carrying body mounted for rotation on an axis perpendicular to the surface to be generated, said body being balanced both statically and dynamically, a plurality of pairs of diametrically opposed axially extending bores in said body, removable cutters mounted in one of each pair of bores and balance weight retainers removably mounted in the other of each pair of bores, said retainers and the weights retained thereby lying back of the cutting surfaces of said cutters, said retainers being adapted to retain weights of different selected values to match the weights of the cutters in the first bore of each pair of bores and to retain such weights at different locations on lines parallel to the axis of said cutting tool.

10. In a rotary cutting tool adapted to generate a flat surface, in combination, a cutter carrying body mounted for rotation on an axis perpendicular to the surface to be generated, said body being balanced both statically and dynamically, a plurality of pairs of diametrically opposed axially extending bores in said body, removable cutters mounted in one of each pair of bores and balance weight retainers removably mounted in the other of each pair of bores, said retainers and the weights retained thereby lying back of the cutting surfaces of said cutters, each of said retainers being adapted to mount, in selected axial positions and fixed radial position in said cutter body, one or more of a graduated series of balance weights selected and positioned to balance statically and dynamically the weight of the cutter mounted in the diametrically opposed bore.

11. In a rotary cutting tool adapted to generate a flat surface, in combination, a cutter carrying body mounted for rotation on an axis perpendicular to the surface to be generated, said body being balanced both statically and dynamically, a plurality of pairs of diametrically opposed axially extending bores in said body, removable cutters mounted in one of each pair of bores and removable balance weight retainers mounted in the other of each pair of bores, each of said retainers having an axially extending bore adapted to receive and axially position selected ones of a graduated series of weights on a fixed axial line, said retainer and the weights retained thereby lying back of the cutting surfaces of said cutters.

12. In a rotary cutting tool adapted to generate a flat surface, in combination, a cutter carrying body mounted for rotation on an axis perpendicular to the surface to be generated, said body being balanced both statically and dynamically, a plurality of pairs of diametrically opposed axially extending bores in said body, removable cutters mounted in one of each pair of bores and balance weight retainers removably mounted in the other of each pair of bores, each of said retainers having an axially extending bore adapted to receive selected ones of a graduated series of weights and axially adjustable means in said bore in said retainer for selectively positioning said weights, said retainer and the weights retained thereby lying back of the cutting surface of said cutters.

13. In a rotary cutting tool adapted to generate a flat surface, in combination, a cutter carrying body mounted for rotation on an axis perpendicular to the surface to be generated and having a reference surface symmetrical about the axis of rotation and perpendicular thereto, said cutter body being balanced both statically and dynamically, a plurality of pairs of diametrically opposed axially extending bores in said body, cutters removably mounted and axially adjustable in one of each pair of bores, each of said cutters having a surface parallel to said reference surface between which parallel surface and the body of said tool selected ones of a graduated series of wafer-like spacers are insertable for spacing said parallel surfaces from said reference surface, and removable balance weight retainers mounted in the other of each pair of bores, each of said retainers being adapted to retain selected ones of a graduated series of balance weights having different weights, sizes and densities on a fixed axial line with the center of mass of said weights at selected positions axially, said retainers and the weights retained thereby lying back of the cutting surfaces of said cutters.

LESTER V. COLWELL.

REFERENCES CITED

The following references are of record in the file of this patent:

UNITED STATES PATENTS

| Number | Name | Date |
| --- | --- | --- |
| 1,256,637 | Armson | Feb. 19, 1918 |
| 1,945,854 | Hall | Feb. 6, 1934 |
| 540,925 | Roy | June 11, 1895 |
| 2,060,901 | Smith | Nov. 17, 1936 |
| 1,248,124 | Hughes | Nov. 27, 1917 |